April 25, 1950     J. R. LAWRENCE     2,505,362
EGG BEATER
Filed July 20, 1946     2 Sheets-Sheet 1
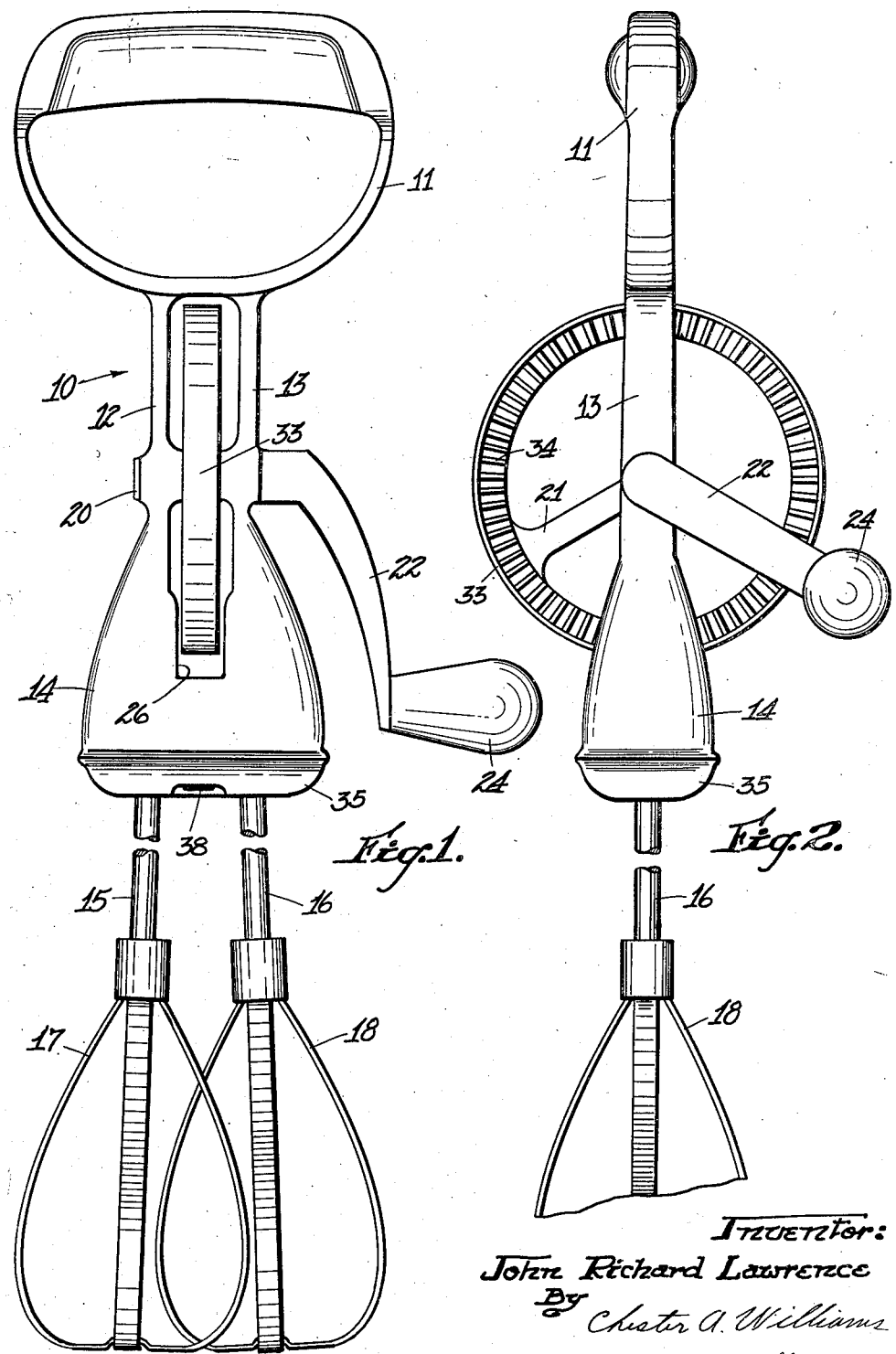
Inventor:
John Richard Lawrence
By Chester A. Williams
Attorney April 25, 1950  J. R. LAWRENCE  2,505,362
EGG BEATER Filed July 20, 1946  2 Sheets-Sheet 2

Inventor:
John Richard Lawrence
By
Chester A. Williams
Attorney

Patented Apr. 25, 1950

2,505,362

UNITED STATES PATENT OFFICE 2,505,362

EGG BEATER

John Richard Lawrence, Worcester, Mass., assignor to The Washburn Company, Worcester, Mass., a corporation of Massachusetts Application July 20, 1946, Serial No. 685,225

2 Claims. (Cl. 74—665)

The present invention relates to egg beaters, and more particularly to the hand operated type in which a pair of beating elements are simultaneously rotated by turning a gear wheel with one hand while holding onto the handle of the beater with the other hand.

An object of the present invention is to provide a beater of the above described type which will have a minimum of exposed rotatable elements to the end that the beater will be safe to operate and will not be liable to tear the operator's hands or catch the operator's garments therein.

Another object of the present invention is to provide a beater which will be sanitary in that the driving elements thereof will be almost completely enclosed and thus they will not be exposed to the food which is agitated by the beater.

A still further object of the present invention is to provide the present type of beater with mechanism that will require a minimum of machining operations for the fabrication and assembly thereof.

With the above and other objects in view, as will hereinafter appear, the invention comprises the devices, combinations and arrangements of parts hereinafter set forth and illustrated in the accompanying drawings of the preferred embodiment of the invention and the advantages attained thereby will be readily understood by those skilled in the art.

In the drawings,

Fig. 1 illustrates a front elevation of the present egg beater.

Fig. 2 represents a right-side elevation of the unit disclosed in Fig. 1.

Figure 3:
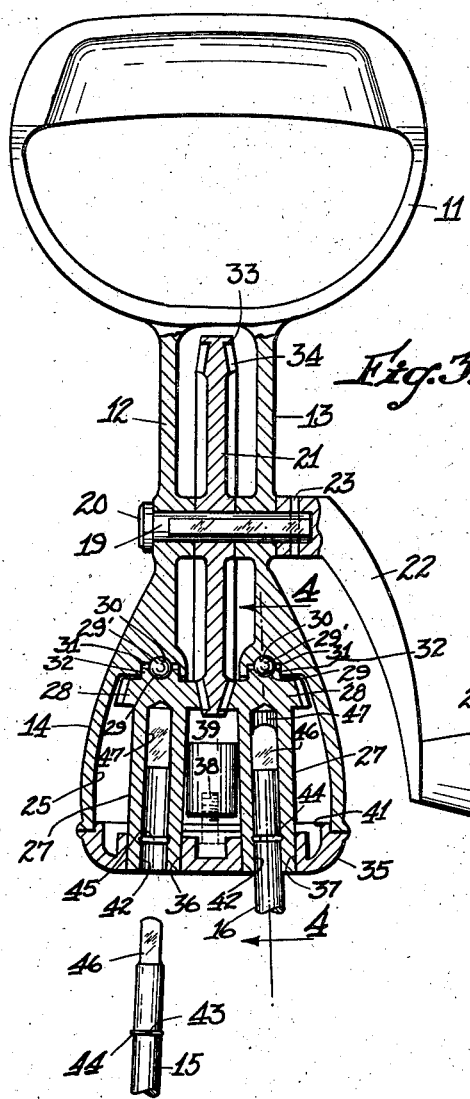
Fig. 3 illustrates a front elevation partly in section, of the present egg beater with one of the beater shafts disassembled therefrom.

Referring to the drawings, the present invention is incorporated in an egg beater having a die-cast unitary body member designated generally by the numeral 10, which body unit comprises a handle arrangement 11, side frame members 12 and 13, and a hollow skirted portion 14. Projecting downwardly and outwardly from the skirted portion 14 are beater shafts 15 and 16 upon the lower portions of which are the usual beater elements 17 and 18.

More specifically, the present unit comprises the spaced frame members 12 and 13 in which is journaled a stub shaft 19 having a head portion 20 provided on one end thereof. Mounted upon the mid-portion of the shaft 19 and between the side frame elements 12 and 13 is a main driving gear 21 which may be keyed upon the shaft 19 in any suitable manner. One end of the shaft 19 projects beyond the side frame member 13 and has mounted thereon a die-cast crank member 22 which is rigidly secured to the shaft 19 by means of a cross pin 23. At the end of the crank element 22 is mounted the usual handle member 24. Thus, rotation of the driving gear 21 is effected by rotating the handle member 24 in either direction.

Figure 4:
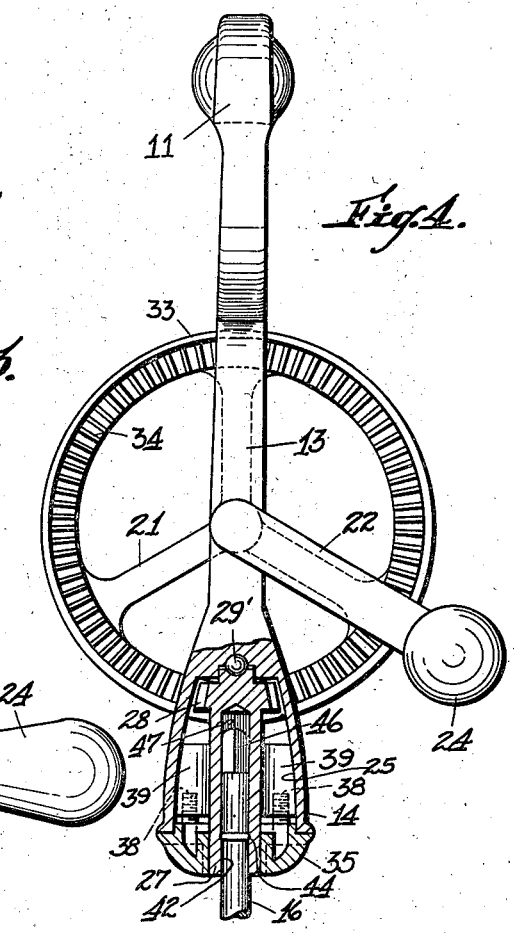
Fig. 4 is a sectional view taken substantially along the line 4—4 of Fig. 3.

Referring particularly to Figs. 3 and 4, the skirted portion 14 of the body unit 10 is provided with a hollow chamber portion 25 which communicates with a vertically disposed slot 26. The driving gear 21 extends downwardly into the slot 26 and consequently a portion of this gear is disposed within the confines of the skirt 14. Disposed entirely within the opening 25 is a pair of die-cast pinion elements each of which comprises a cylindrical shank portion 27 having formed at the top thereof pinion teeth 28. Each of these pinion elements is recessed at the top thereof, as at 29, to receive a thrust bearing in the form of a ball 29'. Each of the balls 29', 29' is adapted to be received also within one of a pair of hemispherical recesses 30 provided in the upper portion of the skirt 14. Thus, each of the balls 29', 29' is disposed between the top portion of a pinion 27 and the upper internal portion of a hollow chamber 25 thereby to function as a thrust bearing.

Figure 5:
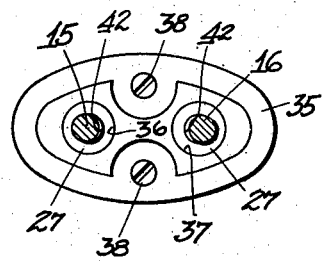
Fig. 5 illustrates a bottom plan view of a cap element illustrated in Fig. 3 in side elevation.
Figure 6:
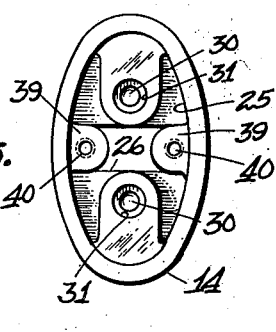
Fig. 6 illustrates a bottom view of the beater disclosed in Fig. 4 with the cap element removed.

In order to align each of the pinion elements 27, 27 the hollow chamber 25 is provided with a pair of cylindrical recesses 31, 31 each of which is adapted snugly to receive an upper cylindrical shoulder 32 formed on the upper portion of the pinion members 27, 27. Each of the pinion members 27, 27 is held within the respective recesses 32, 32 by means of an annular flange 33 which is provided about the periphery of the die-cast driving gear 21. Referring particularly to Fig. 3, it is to be understood that each of the pinion members 27, 27 has its pinion teeth enmeshed with the teeth elements 34 of the gear 21 and further, the bottom portions of the pinion teeth 28 will rest upon the inner periphery of the flange 33. Thus, rotation of the handle member 24 will rotate the gear 21 to the end that the pinion members 27, 27 each will be rotated therewith, In order to give the pinion members 27, 27 proper rigidity, and also to enclose the hollow chamber 25, the present device is provided with a die-cast cap element 35 which is secured over the bottom of the open skirt 14. Referring particularly to Figs. 3 and 5, the die-cast cap element 35 is provided with a pair of apertures 36 and 37 which respectively receive the pinion members 27, 27. A pair of screws 38, 38 provided in the cap element 35 are threaded into a pair of bosses 39, 39 formed in the opposite side walls of the hollow chamber 25. Referring to Fig. 6, it is to be seen that each of the bosses 39, 39 is provided with a threaded aperture 40 for receiving the screws 38. About the upper peripheral portion of the cap element 35 there is provided an annular bead 41 which is adapted to fit snugly within the lower portion of the skirt 14 thereby to provide a substantially dirt-tight enclosure.

Each of the pinion members 27, 27 is provided axially thereof with a bore 42 which is adapted to slidingly receive the upper cylindrical portion of one of the beater shafts 15 and 16. About the upper portion of each of the beater shafts 15 and 16 is provided an annular groove 43 which is adapted to receive a split circular ring 44. Correspondingly provided in each of the pinion bores 42, 42 is an annular groove 45 which is adapted to receive the ring 44 whenever one of the beater shafts is inserted therein. Each of the rings 44, 44 normally projects beyond the periphery of the beater shaft but whenever the shaft is inserted into the bore 42 the ring 44 is compressed to the degree that it closes in order to permit the insertion of the beater shaft into the bore 42. As soon as the ring 44 is in register with the annular flange 45 it will snap open thus to retain the beater shaft within the bore 42. The top portion of each of the beater shafts 15 and 16 is provided with a head 46 having a substantially square cross section. Correspondingly formed in the upper portion of each of the axial bores 42, 42 is a portion 47 having a square cross section for the purpose of receiving the head 46 of one of the beater shafts 15 and 16. Thus, whenever the beater shafts 15 and 16 are inserted within the bores 42, 42 the head portions 46, 46 will be received within the bores 47, 47 to the end that the beater shafts can not rotate relative to the pinion elements 27, 27.

It will be understood from the above description, that the present beater shafts 15 and 16 may be readily inserted into or withdrawn from the hollow skirt 14 and, therefore, the entire beater unit need not be subjected to a washing operation after the same has been used as the operator may remove the beating elements and wash them only.

Thus, the unitary body portion of the present beater, comprising the handle 11, the spaced frame members 12 and 13, and the hollow skirt 14, may be die-cast in one operation to form substantially the structure as herein illustrated and described. Likewise, the pinion gears 27, 27 as well as the crank 22, the cap 35, and the driving gear 21 may each be die-cast and assembled with the body 10 thereby to produce a beater unit which requires only a few simple machining operations for the production thereof.

It is also to be understood that the hollow skirt 14 along with the cap 35, forms a hollow chamber in which the pinion gears 27, 27 are entirely enclosed. The driving gear 21, by extending into the slotted opening 26 of the chamber, effectively seals this opening so that foreign matter will not be collected therein. The present construction, therefore, is advantageous in that the pinion gear teeth 28 and the driving gear teeth 34 are guarded to the end that neither the operator's hands nor garments will be caught by the gears. The flange 33 about the gear 21 is not only effective to hold the pinion gears in place but it also functions as a guard to keep foreign elements from being caught by the otherwise projecting gear teeth.

I claim:

1. A beater comprising, a unitary body member, said body member including, a handle, a pair of spaced frame members depending from said handle, and a hollow bell-shaped skirt member formed at the lower ends of said spaced frame members and having openings in the upper and lower portions of said skirt in line with the space provided between said spaced members, a cap removably disposed over the bottom opening of said hollow skirt and having a pair of cylindrical bearing apertures therein, a driving gear journaled between said spaced frame members and extending into said hollow skirt member through the upper opening therein, an annular flange disposed about the periphery of said driving gear, a pair of pinion gears, each of said pinion gears including a gear portion with a shank extending axially therefrom and being disposed entirely within said hollow skirt with the gear portion thereof in mesh with said driving gear and in engagement with the inner peripheral portion of said annular flange so as to be axially supported thereby in one direction, the shank portion of each of said pinion gears being rotatably journaled within a respective one of the bearing apertures formed in said cap, a thrust element in the form of a ball disposed between each of said pinion gears and the inner portion of said hollow skirt member, and beater elements attached to the shank portions of said pinion gears.

2. The combination with a beater having a handle, a frame depending from said handle, a hollow bell-shaped skirt formed at the lower end of said frame and having openings in the upper and lower portions of said skirt, and a cap removably disposed over the bottom opening of said hollow skirt and having a pair of bearing apertures therein; of a driving gear journaled in said frame and extending into said hollow skirt member through the upper opening therein, an annular flange disposed about the periphery of said driving gear, a pair of pinion gears, each of said pinion gears including a gear portion with a hollow shank portion extending axially therefrom and being disposed entirely within said hollow skirt with the gear portion thereof in mesh with said driving gear and in engagement with the inner peripheral portion of said annular flange so as to be axially supported thereby in one direction, the shank portion of each of said pinion gears being rotatably journaled within a respective one of the bearing apertures formed in said cap, a thrust element in the form of a ball disposed between each of said pinion gears and the inner portion of said hollow skirt member so as axially to support the gear in the other direction, and a pair of beater shafts of which each is removably insertable within the hollow portion of a respective one of said gear shanks.

JOHN RICHARD LAWRENCE.

(References on following page)

REFERENCES CITED

The following references are of record in the file of this patent:

UNITED STATES PATENTS

| Number | Name | Date |
|---|---|---|
| 232,125 | Henry | Sept. 14, 1880 |
| 620,929 | Jocelyn | Mar. 14, 1899 |
| 1,623,256 | Lienhard | Apr. 5, 1927 |
| 1,738,112 | Myers | Dec. 3, 1929 |
| 2,098,098 | Jepson | Nov. 2, 1937 |
| 2,243,443 | Sette | May 27, 1941 |

FOREIGN PATENTS

| Number | Country | Date |
|---|---|---|
| 159,397 | Switzerland | Apr. 1, 1933 |